United States Patent
Tousignant et al.

(10) Patent No.: US 8,122,092 B2
(45) Date of Patent: Feb. 21, 2012

(54) AUTO-RESOLVE RECIPIENTS CACHE

(75) Inventors: Patrick Tousignant, Bellevue, WA (US); Selvaraj Nalliah, Redmond, WA (US); Shivakumar Seetharaman, Snoqualmie, WA (US); Salman Zafar, Mill Creek, WA (US); John Allen Atwood, Duvall, WA (US); Gregory Bolles, Snohomish, WA (US); Juan Vicente Esteve Balducci, Sammamish, WA (US); Kevin Resnick, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 338 days.

(21) Appl. No.: 12/268,322

(22) Filed: Nov. 10, 2008

(65) Prior Publication Data

US 2010/0121922 A1     May 13, 2010

(51) Int. Cl.
*G06F 15/16* (2006.01)
(52) U.S. Cl. ........................................... 709/206
(58) Field of Classification Search .................. 709/206
See application file for complete search history.

(56) References Cited

U.S. PATENT DOCUMENTS

| 7,139,555 | B2 | 11/2006 | Apfel |
| 7,383,250 | B2 | 6/2008 | Scian |
| 2005/0108344 | A1* | 5/2005 | Tafoya et al. ................. 709/206 |
| 2005/0131888 | A1 | 6/2005 | Tafoya |
| 2005/0204007 | A1* | 9/2005 | McGregor et al. ............ 709/206 |
| 2006/0010104 | A1 | 1/2006 | Pettinati |
| 2006/0020804 | A1 | 1/2006 | Schleifer |
| 2006/0288211 | A1 | 12/2006 | Vargas |
| 2007/0198374 | A1* | 8/2007 | Siegel et al. .................... 705/28 |
| 2008/0133775 | A1 | 6/2008 | Peterson |
| 2009/0119678 | A1* | 5/2009 | Shih et al. ...................... 719/313 |
| 2009/0307315 | A1* | 12/2009 | Murphy et al. ............... 709/206 |

OTHER PUBLICATIONS

Ren Ligang and Song, Jude: Data Synchronization in the Mobile Internet; PCN&CAD Lab, Beijing University of Posts and Telecommunications; Dec. 10, 2002, pp. 95-98; China.
MICROSOFT.COM; Introduction to Outlook Mobile Service; as downloaded from http://office.microsoft.com/en-us/outlook/HA101078921033.aspx, on Jul. 8, 2008, pp. 1-3.
ROQU3.COM; Lotus Notes Type-ahead vs Outlook Auto name checking; http://roqu3.com/lotus-notes-type-ahead-vs-outlook-name-checking/; Mar. 6, 2008, pp. 1-4.
OUTLOOK-TIPS.NET; Tip 99: What is Autoresolve and Autocomplete?; http://outlook-tips.net/cs/blogs/outlooktips/archive/2004/02/23/452.aspx; Feb. 23, 2004, pp. 1-4.

* cited by examiner

*Primary Examiner* — Joseph E. Avellino
*Assistant Examiner* — Jeong S Park
(74) *Attorney, Agent, or Firm* — Merchant & Gould P.C.

(57) ABSTRACT

In embodiments, mobile devices request and utilize recipient caches. Recipient caches store information regarding previous recipients of communications. The information on recipients includes when the recipient was last contacted and the frequency with which a recipient is contacted. In embodiments, a mobile device requests a recipient cache from a server. When a user types a string of text, the mobile device then uses the recipient cache as well as the contacts and emails on the mobile device and resolves a recipient list. In other embodiments, a recipient cache on a server is updated when a mobile device sends a message with new recipient information. In another embodiment, a server resolves conflicting messages by using recipient information.

19 Claims, 8 Drawing Sheets

AUTO-RESOLVE RECIPIENTS CACHE

BACKGROUND

Email has revolutionized modern-day communication. Users can now access their personal email accounts anywhere. The more traditional modes of email access such as desktop computers are no longer the only means of accessing and using email accounts. A variety of devices are now available. Mobile devices, such as cell phones, personal digital assistants and other handheld devices now possess the capability to send and receive email messages. When a user receives an email to their account, the email message is sent directly to the user's mobile device. A user can then open, read, and reply to the email message on the mobile device.

Despite the convenience of accessing an email account using a mobile device, mobile devices, by their very nature, have small screens and keyboards, which makes some tasks such as typing out a long email address more difficult. As a result, a user's experience in accessing email from a mobile device is typically not as rich as accessing email from a desktop or laptop computer.

It is with respect to these and other considerations that embodiments of the present invention have been made. Also, although relatively specific problems have been discussed, it should be understood that embodiments of the present invention should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Described are embodiments directed to accessing and utilizing recipient caches on a mobile device. Recipient caches contain information about individual recipients of previous communications. The information can include the time and date a recipient was last contacted and the frequency with which a recipient is contacted. In embodiments, a mobile device requests a recipient cache from a server. In embodiments, when a user types a string of text, the recipient cache is then utilized along with the contacts and the emails on the mobile device to resolve a recipient list. Other embodiments provide for updating a recipient cache on a server with new recipient information by using information contained in a message sent by a mobile device. Further, in other embodiments, when a server is updating its recipient cache it resolves conflicting recipient information from different messages by using the most recent recipient information.

Embodiments may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Figure 1:
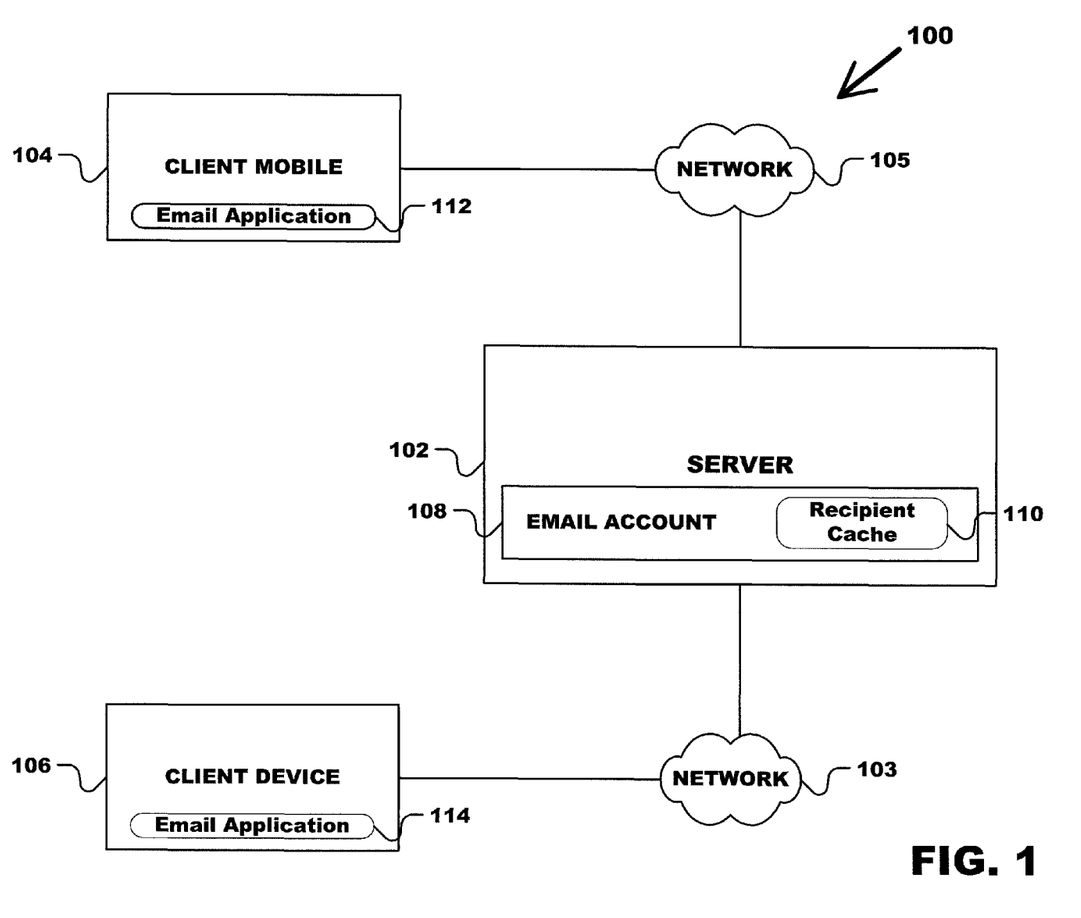
FIG. 1 illustrates a network system, according to an embodiment.

FIG. 1 illustrates a network system 100, according to an embodiment. System 100 includes a client mobile device 104 and a client device 106 that may access a server 102 through networks 103 and 105 illustrated in FIG. 1. In an embodiment, client mobile device 104 is a cell phone or personal digital assistant (PDA) and includes email application 112. In another embodiment, client device 106 is a laptop or desktop computer and includes email application 114. In the embodiment shown in FIG. 1, server 102 stores an email account 108 that can be accessed by a user using client mobile device 104 or client device 106. The email account 108 stores a variety of information associated with a user such as emails, contacts, calendar information, and also includes a recipient cache 110. In one embodiment, the recipient cache 110 is an XML document which stores information about people that have sent or received communications to and from the email account 108. Recipient cache 110 contains information about individual recipients, such as the time and date a recipient was last contacted and the frequency with which a recipient is contacted.

A user can utilize applications 112 and 114 to access the information in account 108 such as to check whether they received any new emails, send emails, change contact information, or change calendar information etc. Also, applications 112 and 114 can request recipient cache 110 to allow a user to resolve a recipient list.

Figure 2:
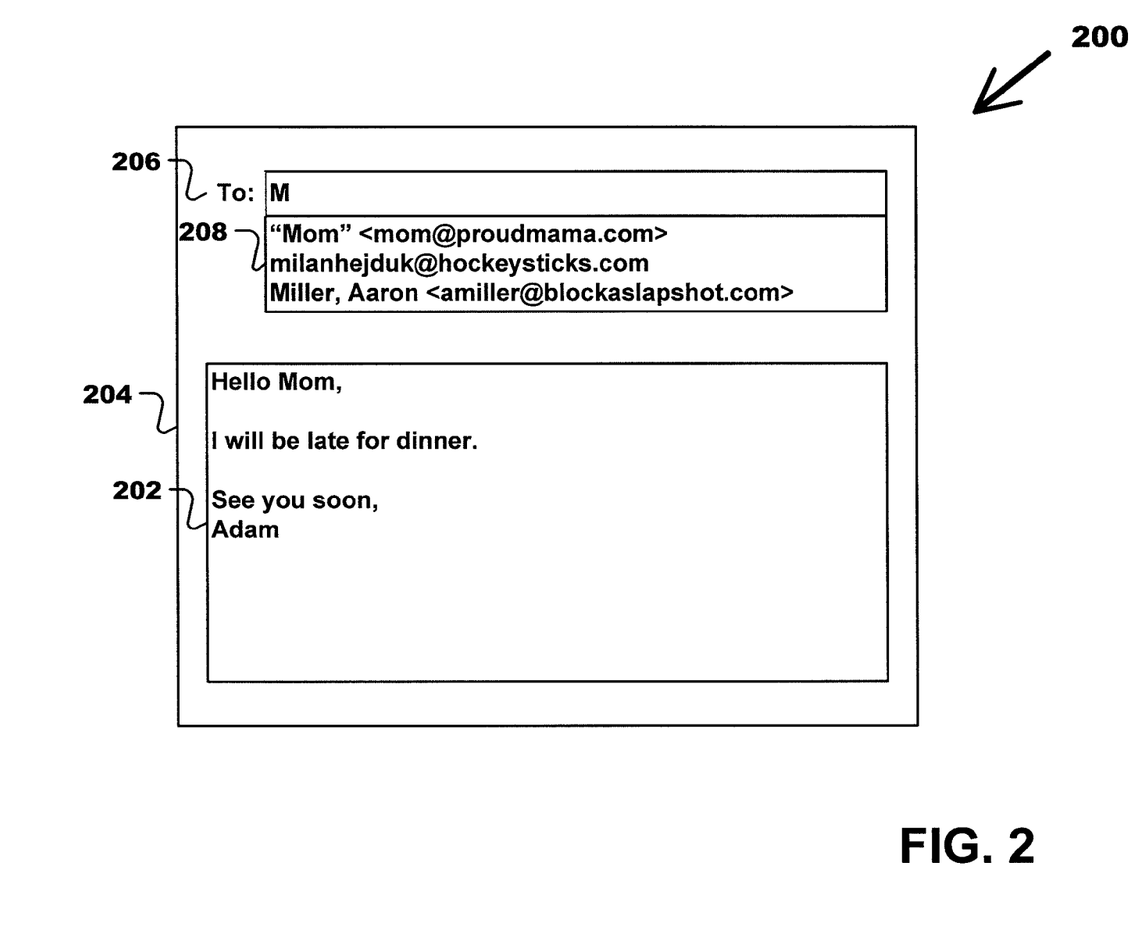
FIG. 2 illustrates a recipient list, according to an embodiment.

With reference to FIG. 2, an embodiment of the resolution of a recipient list from a user perspective is illustrated. In an embodiment, an email 204 is created in an email application 202 in a client mobile device 104 (FIG. 1). A user enters a string of text 206 into the client mobile device. In this embodiment, the user entered an "M". The client mobile device, in some embodiments, then executes the operations described in FIGS. 3, 4, and 5. The client mobile device then resolves a recipient list 208, which is presented as illustrated. In an embodiment, the recipient list 208 includes aliases, email addresses, and formal names of individual recipients, such as illustrated in FIG. 2 as "Mom", mhejduk@hockeysticks.com, and Miller, Aaron respectively. In one embodiment, the recipient list 208 can be restricted to allow for a limited number of recipients. For example, if a user wishes to limit the amount of memory and processing required to access the recipient cache, a user can request that only 10 recipients to be included.

Generally, system 100 operates as follows. Client mobile device 104 or client device 106 issues a request to server 102. The request is for the recipient cache 110 residing on server 102. When the server 102 receives the request, the server accesses local email account 108. The local email account 108 stores a recipient cache 110. The server 102 then responds to the client mobile device 104 or client device 106 by sending a recipient cache 110. The client mobile device 104 or client device 106 then accesses the sent recipient cache 110 as well as local contacts and emails to resolve a recipient list. More specific embodiments are described in relation to FIGS. 3, 4, and 5.

System 100 provides a number of advantages to users. It provides a user with a more integrated experience through the accessibility of a recipient cache on a mobile device and the update of a recipient cache residing on a server. As previously mentioned, mobile devices are limited by the size of the screen and keyboard, making it difficult for users to easily type recipient information, such as email addresses. System 100 allows users to have access to their recipient cache on their mobile devices. A user can merely type a string of text, such as the first letter in a person's name, and the user's most commonly contacted recipients will appear for easy selection as described in more detail below.

It should be understood that system 100 is non-limiting and is for illustration purposes only. For example, FIG. 1 only illustrates client mobile device 104 and client device 106, which is connected to server 102 through network 103. As those with skill in the art will appreciate, in embodiments there may be more than one client each of which can send requests to server 102 through networks 103 and 105 and/or other networks. Also, network 103 may be any type of computer network that is useful in connecting computer systems. Networks 103 and 105 for example may be a local area network (LAN) or wide area network (WAN), such as the Internet. In some embodiments, networks 103 and 105 include an intranet, the Internet and/or combinations thereof. Further, although system 100 shows only one server, in embodiments, system 100 may include more than one server.

Figure 3:
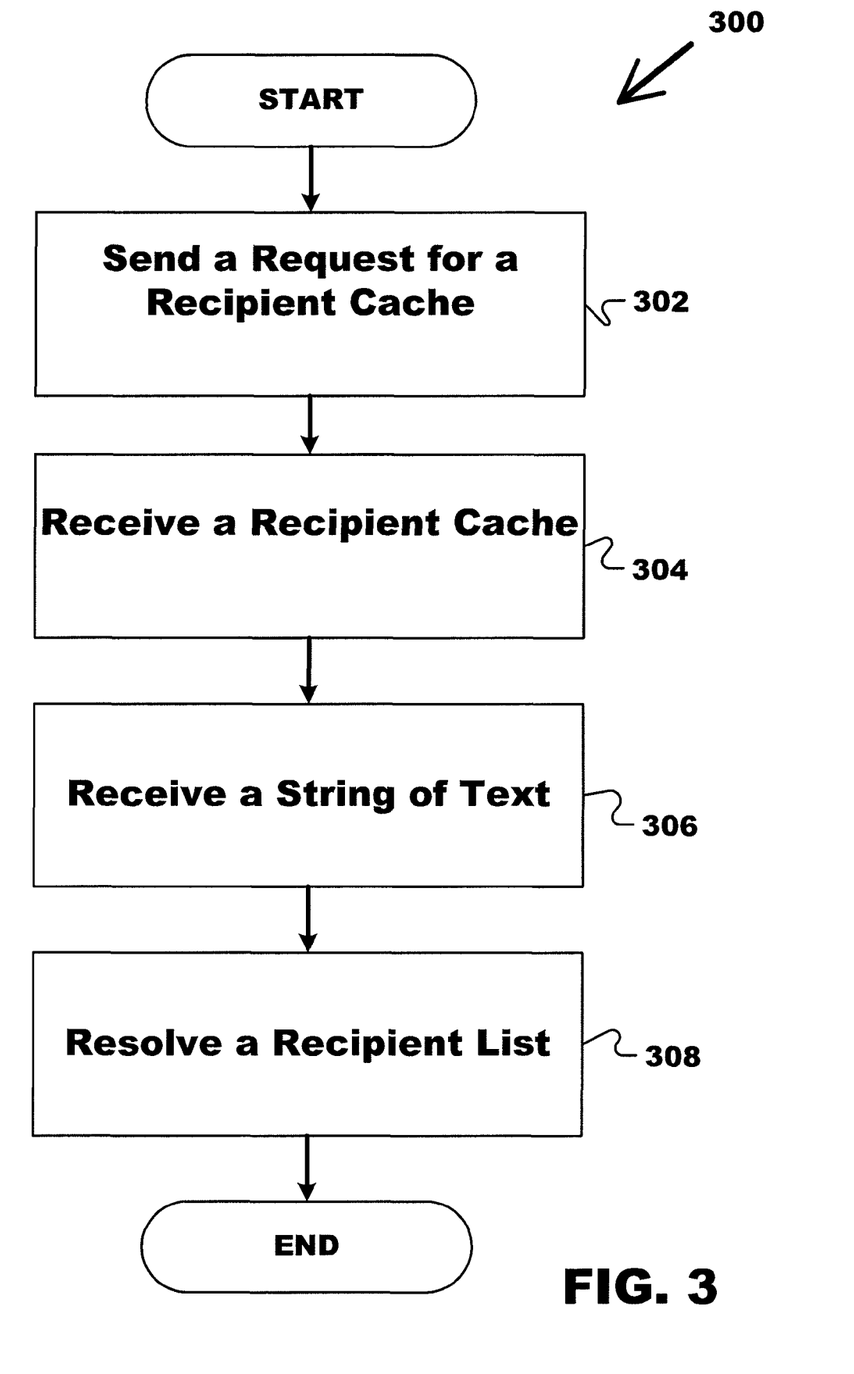
FIG. 3 illustrates an operational flow for receiving a recipient cache and resolving a recipient list on a mobile device, according to an embodiment.
Figure 4:
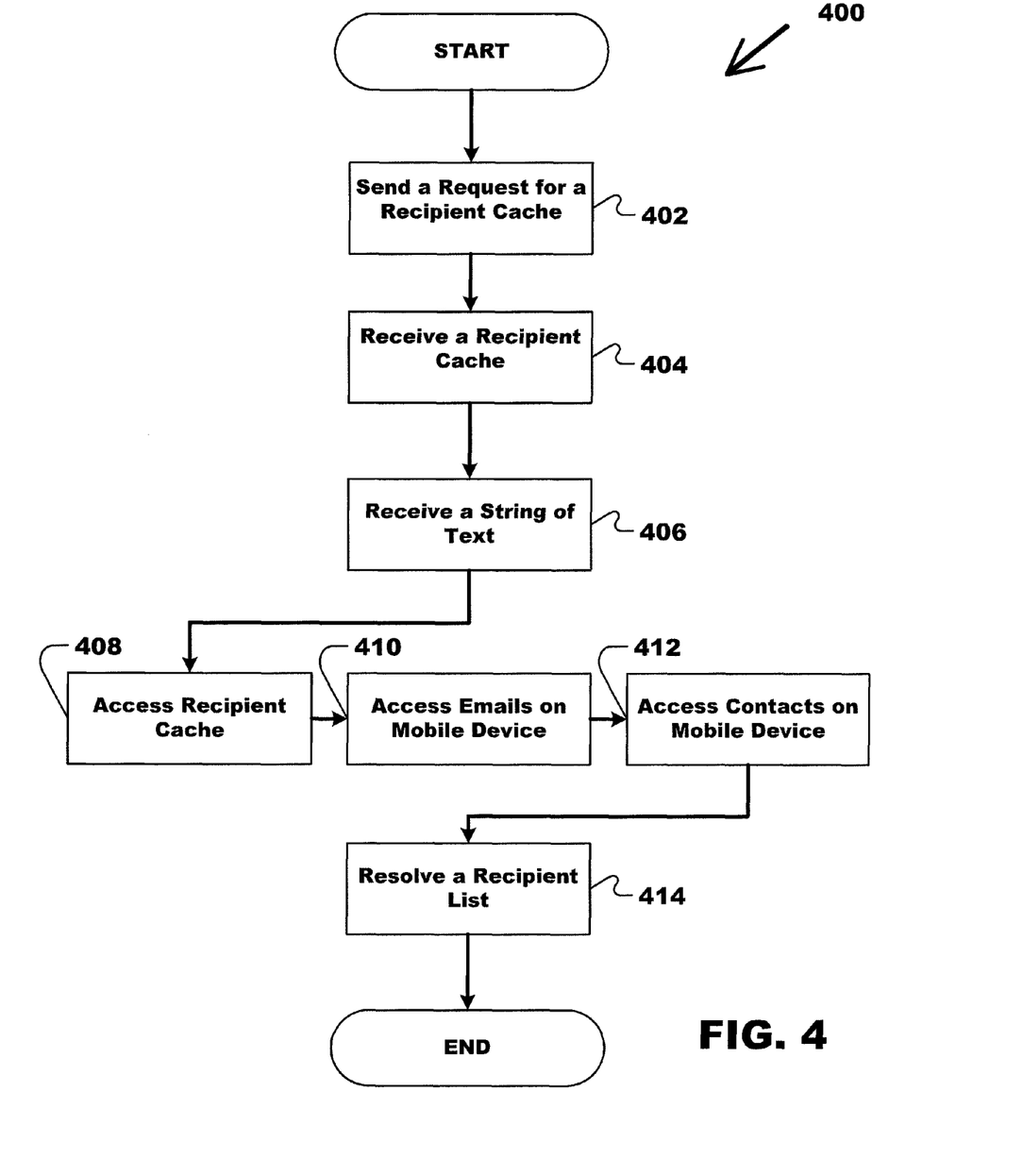
FIG. 4 illustrates an operational flow for receiving a recipient cache and resolving a recipient list on a mobile device, according to an embodiment.

FIGS. 3 and 4 illustrate operational flows 300 and 400, according to embodiments. Operational flows 300 and 400 may be performed in any suitable environment. For example, the operational flows may be executed in environments such as illustrated in FIG. 1. Therefore, the description of operational flows 300 and 400 may refer to at least one of the components of FIG. 1. However, any such reference to components of FIG. 1 is for descriptive purposes only, and it is to be understood that the implementations of FIG. 1 are non-limiting environments for operational flows 300 and 400.

Furthermore, although operational flows 300 and 400 are illustrated and described sequentially in a particular order, in other embodiments, the operations may be performed in different orders, multiple times, and/or in parallel. Further, one or more operations may be omitted or combined in some embodiments.

FIG. 2 illustrates an operational flow 200 according to an embodiment, for processing requests received by a server that is part of a distributed system such as system 100 (FIG. 1). In embodiments, flow 200 will be implemented by client mobile device 104 (FIG. 1). However, it should be understood that flow 200 is not limited to this specific embodiment. Flow 200 is described below as being implemented by one embodiment of a client mobile device that includes an email application for processing requests.

Flow 300 begins at operation 302, where a request is sent. In embodiments, the request is generated by a client mobile device to access a recipient cache residing on a server. A server that is part of the distributed system receives the request from the client at operation 302. For example, in embodiments the request may be generated by client mobile device 104 (FIG. 1) and received by server 102 (FIG. 1).

In one embodiment, a client mobile device requests a recipient cache from a server. After a client mobile device requests a recipient cache from a server at operation 302, the flow passes to operation 304. At operation 304, a client mobile device receives a recipient cache from a server. The flow then progresses to operation 306, where a client mobile device receives a string of text from a user. In operation 308, the string of text is then utilized by a client mobile device to resolve a recipient list based partially on the recipient cache from a server as well as the local contacts and emails on the client mobile device. The recipient list at operation 308 is presented to the client mobile device user for selection of a recipient. Flow then ends at operation 308. In an alternate embodiment, the client mobile device receives a string of text 306 before the client mobile device requests the recipient cache 304. In one embodiment, the recipient cache can be stored locally on the client mobile device which makes retrieval of information more efficient. Alternatively, the recipient cache may be cyclically accessed by the client mobile device 104 (FIG. 1).

FIG. 4 illustrates an operational flow 400 that is one embodiment of operation 308 (FIG. 3) for resolving a recipient list on the client mobile device. In embodiments, flow 400 will be implemented by client mobile device 104 (FIG. 1). However, it should be understood that flow 400 is not limited to this specific embodiment. Flow 400 is described below as being implemented by a client mobile device that includes an email application.

Flow 400 begins at operation 402, where a client mobile device requests a recipient cache from a server. A client mobile device that is part of a computer system sends a request to a server at operation 402. For example, in embodiments, the request is generated by client mobile device 104 (FIG. 1) and received by server 102 (FIG. 1). Flow passes from operation 402 to operation 404 where a recipient cache is sent to the mobile device from a server. The recipient cache 110 (FIG. 1), in embodiments, is stored in an email account 108 on a server 102 (FIG. 1). In an alternate embodiment, operations 402 and 404 are sub-steps to operation 408, where the recipient cache is accessed by the client mobile device 104 (FIG. 1).

Figure 5:
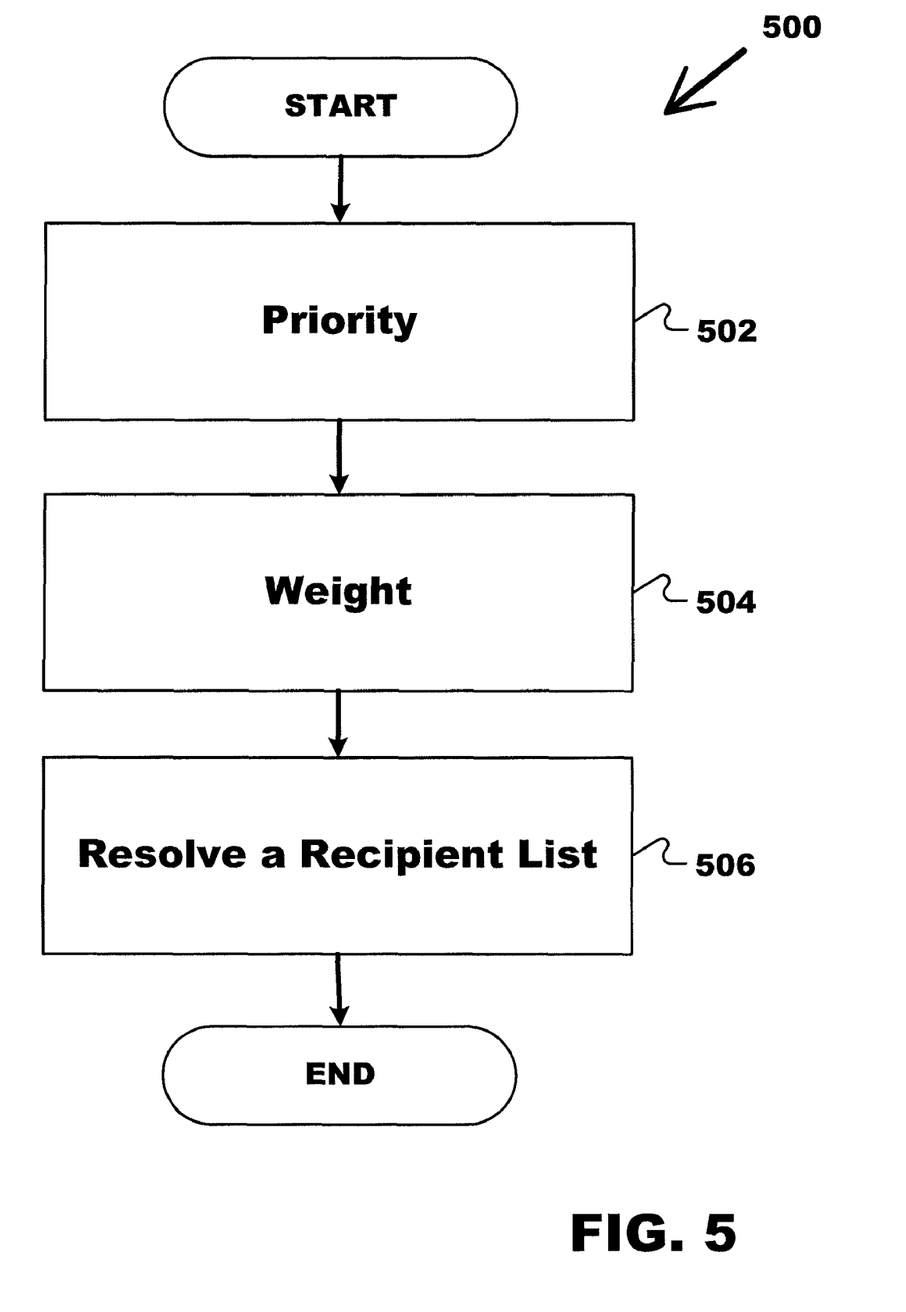
FIG. 5 illustrates an operational flow for resolving a recipient list on a mobile device, according to an embodiment.

Flow passes from operation 404 to operation 406 where, in an embodiment, a client mobile device receives a string of text from a user. In embodiments, the string of text is received by a client device, from a user that wants to compose an email. The flow then progresses to operations 408, 410, and 412. In these operations, the client mobile device utilizes a method of generating a recipient list. An embodiment describing generating of a recipient list based on priority and assigned weight are discussed in more detail below (FIG. 5). At operation 408, the client mobile device utilizes the received recipient cache as one source of recipient to include in a recipient list. The flow then proceeds to operation 410. The client mobile device at operation 410 access emails residing on the client mobile device and uses the emails as a second source of recipients. At operation 412, the client mobile device accesses the contacts on the client mobile device as a final source of recipients for the recipient list. After accessing the recipient cache 408, emails on the client mobile device 410, and the contacts on the client mobile device 412, the flow progresses to operation 414 to resolve a recipient list. Operation 414 may utilize any method or algorithm for generating a recipient list. As one example, at operation 414 the recipient list can be generated by using a simple priority method, such as listing recipients in order of most recently communicated with, i.e., the recipient communicated most recently is listed first. This is merely one example of a method that may be used in operation 414. As mentioned previously, an embodiment of resolving a recipient list using assigned weight is discussed in more detail in FIG. 4.

As explained above, the operations of flow 400 described in FIG. 4 are not intended to be limiting and in other embodiments, flow 400 may include additional operations, or less than the operations illustrated in FIG. 4. In embodiments, flow 400 may include additional or less sources of possible recipients to resolve a recipient list. For example, there may be four, or more, sources of possible recipients, e.g., recipients recently called. In another example, there may be only two or one sources of possible recipients. In these embodiments, flow 400 will include operations for accessing and utilizing all sources of recipient information for generating a recipient list.

FIG. 5 illustrates an operational flow 500 that is one embodiment of operation 414 (FIG. 4), resolve a recipient list. In the embodiment shown in FIG. 5, client device 104 (FIG. 1) resolves a recipient list based on priority and assigned weight. At operation 502, a client device prioritizes recipients accessed from different stores of recipient information as part of generating a recipient list. In one embodiment, the priority is ordered as follows: the recipient cache 408, the emails on the client mobile device 410, and the contacts on the client mobile device 412. After the client mobile device has recipient information based on priority, the flow progresses to operation 504. At operation 504, the client mobile device then ranks the recipient list based on an assigned weight. The weight of a recipient is calculated, in some embodiments, using a frequency with which a recipient is contacted and how recently the recipient has contacted, or been contacted by, the user. At operation 506, the client mobile device resolves a recipient list based on the calculation of both of weight and priority.

As explained above, the operations of flow 500 detailed in FIG. 5 are not intended to be limiting and in other embodiments, flow 500 may utilize only the priority of sources of recipient information or the weight of individual recipient information to resolve a recipient list. Additionally, another embodiment may use additional factors to resolve a recipient list. For example, a user may be able to mark certain contacts to cause the recipients to appear higher in the final recipient list. In these embodiments, flow 500 will includes operations for including the additional factors in resolving the recipient list.

Figure 6:
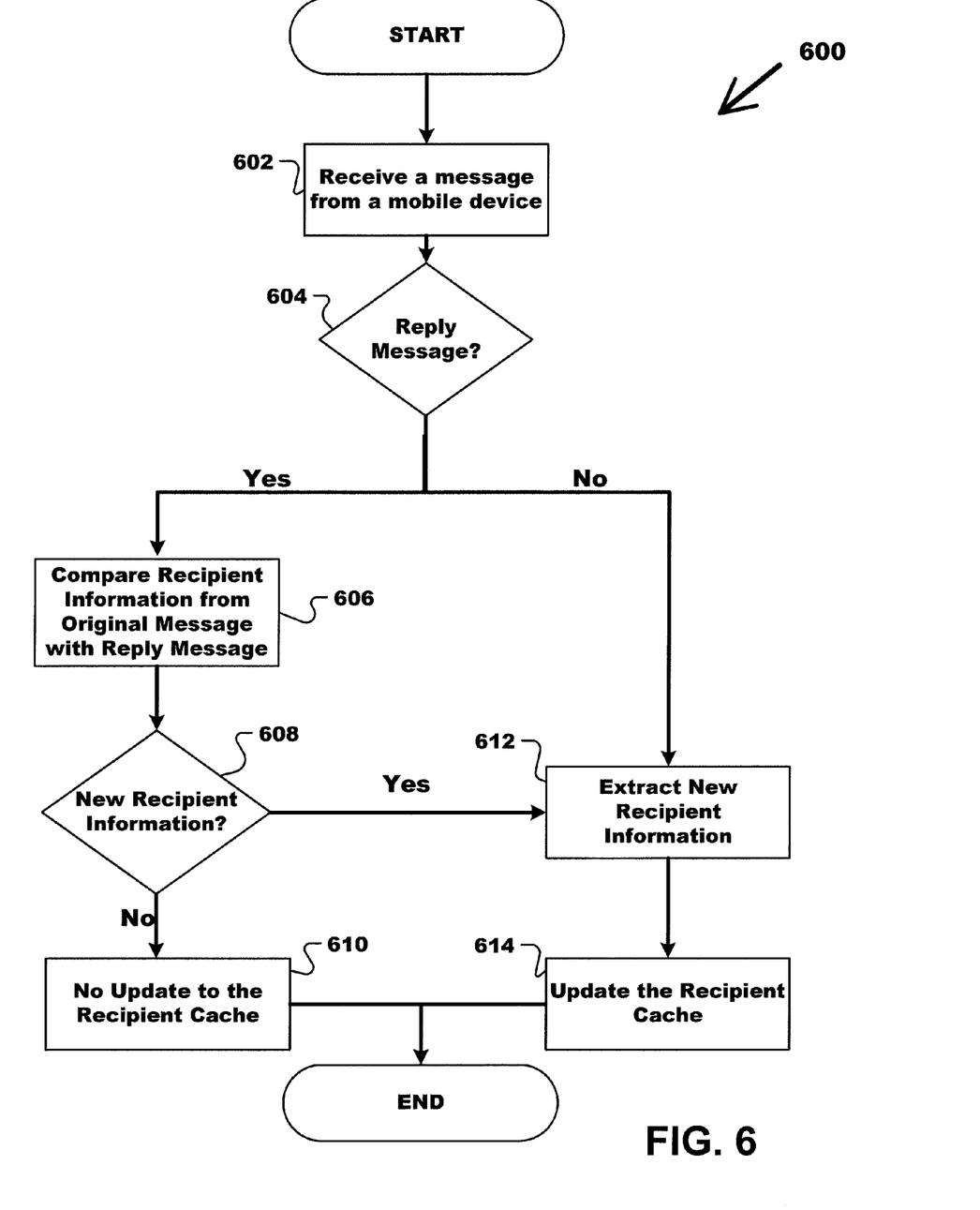
FIG. 6 illustrates an operational flow for a server receiving a message from a mobile device and updating a recipient cache, according to an embodiment.
Figure 7:
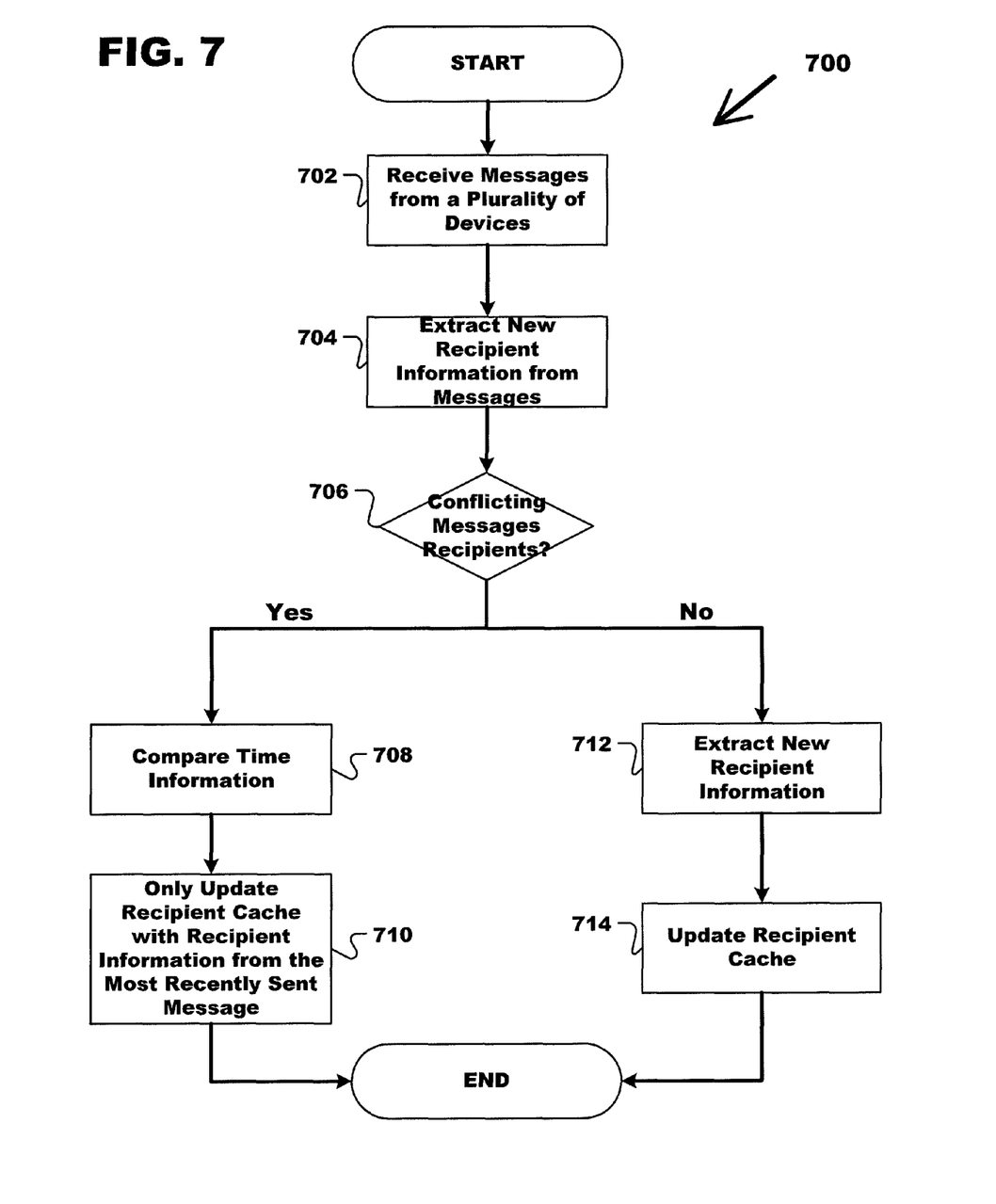
FIG. 7 illustrates an operational flow executed by a computer storage medium to resolve conflicting messages and update a recipient cache, according to an embodiment.

FIGS. 6 and 7 illustrate operational flows 600 and 700 that are implemented on server 102 (FIG. 1) to update recipient caches 110 (FIG. 1), according to embodiments. Although operational flows 600 and 700 are illustrated and described sequentially in a particular order, in other embodiments, the operations may be performed in different orders, multiple times, and/or in parallel. Further, one or more operations may be omitted or combined in some embodiments.

FIG. 6 describes an embodiment of an operation flow 600 of a server receiving a message from a mobile device and updating a recipient cache 110 (FIG. 1) residing on a server 102 (FIG. 1). At operation 602, a server receives a message from a mobile device. The preferred embodiment of the message is an email message. However, the message may be in other forms such as SMS and others. The flow progresses to operation 604, where a determination is made as to whether the message is a reply to a previous email. If the message is a reply message, the flow moves to operation 606. At operation 606, the reply message is reviewed against the original email message. At 608, a determination is made as to whether there are any additional recipients between the messages. If there are no new recipients added to the reply message, the flow progresses to operation 610. At operation 610, there is no update to the recipient cache. However, if at operation 608 a determination is made that there is new recipient information, the flow progresses to operation 612. At operation 612, new recipient information is extracted from the reply message. The recipient cache is then updated with the new recipient information at operation 614.

Alternatively, if a determination is made at operation 604 that the message received by the server is not a reply message, the flow progresses to operation 612. This embodiment would include messages, such as SMS messages. For example, a user may compose a SMS message rather than an email. At operation 612, the new recipient information is extracted. At operation 614, the recipient cache is updated with the new recipient information.

Operational flow 600 provides a number of advantages including that it does not require the mobile device to receive the recipient cache as outlined in operational flows 200 and 300. An email message composed and sent from a mobile device, without the use of a recipient cache, to a server will update the recipient cache as outlined in operational flow 600 regardless of whether the mobile device received the recipient cache when composing the email message.

FIG. 7 illustrates an operational flow 700 for resolving conflicts in different email messages. Conflicting email messages arise when the same individual recipients are contacted from a plurality of devices. Flow 700 begins at operation 702, where a server receives messages from a plurality of devices. The flow then progresses to operation 704. In alternate embodiments, an intermediate step exists between operations 702 and 704, where the server both receives and sends the message before progressing to operation 704. At operation 704, the server extracts new recipient information from the messages. At operation 706, a determination is made whether the new recipient information from the messages conflict with one another because they both have the same individual recipients. If both messages contain the same individual recipients, the flow proceeds to operation 708. At operation 708, time information from the messages is compared. In some embodiments, a time and date stamp is compared to determine the time information for the messages. At operation 710, the recipient cache is only updated with individual recipient information of the message with the most recent time information.

Otherwise, if at operation 706 a determination is made that the messages do not conflict, the flow progresses to operation 712. The new recipient information is extracted at operation 712. At operation 714, the recipient cache is updated with the new recipient information.

Figure 8:
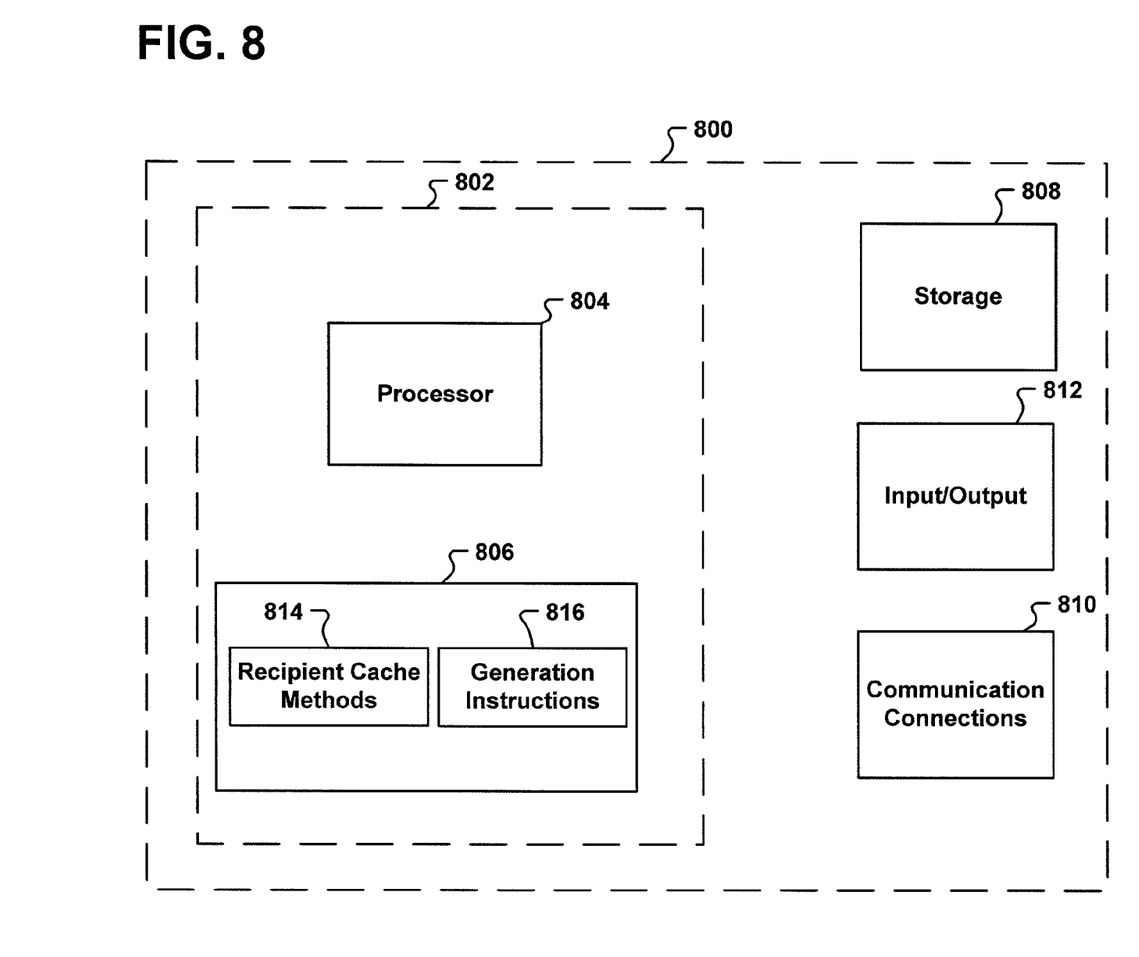
FIG. 8 illustrates a computing environment suitable for implementing embodiments.

With reference to FIG. 8, an embodiment of a computing environment for implementing the various embodiments described herein includes a computer system, such as computer system 800. Any and all components of the described embodiments may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 800 comprises at least one processing unit or processor 804 and system memory 806. The most basic configuration of the computer system 800 is illustrated in FIG. 8 by dashed line 802. In some embodiments, one or more components of the described system are loaded into system memory 806 and executed by the processing unit 804 from system memory 806. Depending on the exact configuration and type of computer system 800, system memory 806 may be volatile (such as RAM), non-volatile (such as ROM, flash memory, etc.), or some combination of the two.

Additionally, computer system 800 may also have additional features/functionality. For example, computer system 800 includes additional storage media 808, such as removable and/or non-removable storage, including, but not limited to, magnetic or optical disks or tape. In some embodiments, software or executable code and any data used for the described system is permanently stored in storage media 808. Storage media 808 includes volatile and non-volatile, removable and non-removable media implemented in any method or technology for storage of information such as computer readable instructions, data structures, program modules, or other data. In embodiments, the capability negotiation methods and wrapper inner methods are stored in storage media 808.

System memory 806 and storage media 808 are examples of computer storage media. Computer storage media includes RAM, ROM, EEPROM, flash memory or other memory technology, CD-ROM, digital versatile disks ("DVD") or other optical storage, magnetic cassettes, magnetic tape, magnetic disk storage, other magnetic storage devices, or any other medium which is used to store the desired information and which is accessed by computer system 800 and processor 804. Any such computer storage media may be part of computer system 800. In some embodiments, mammogram images and/or results of probability determination are stored in system memory 806. In embodiments, system memory 806 and/or storage media 808 stores data used to perform the methods or form the system(s) disclosed herein, such as generating well-defined messages, expressing a collective intent of security semantics, accepting and/or rejecting well-defined messages, etc. In embodiments, system memory 806 would store information such as Recipient Cache methods 814 and generation instructions 816. In embodiments, Recipient Cache methods 714 may be general Recipient Cache methods, recipient cache transfer methods, recipient cache update methods, or any other type of Recipient Cache methods. Generation instructions 716, in embodiments, store the instructions necessary to generate the Recipient Cache methods and/or perform the disclosed methods and systems. For example, generation instructions 716 may include functions or processes for generating a recipient cache transfer method, recipient cache update method, etc.

Computer system 800 may also contain communications connection(s) 810 that allow the device to communicate with other devices. In embodiments, communications connection(s) 810 may be used to transmit and receive messages between sender devices, intermediary devices, and recipient devices. Communication connection(s) 810 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, Recipient Cache methods may be transmitted over the communication connection(s) 810.

In some embodiments, computer system 800 also includes input and output connections 812, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 812 are used to display the information as described herein. All these devices are well known in the art and need not be discussed at length here.

In some embodiments, the component described herein comprise such modules or instructions executable by computer system 800 that may be stored on computer storage medium and other tangible mediums and transmitted in communication media. Computer storage media includes volatile and non-volatile, removable and non-removable media implemented in any method or technology for storage of information such as computer readable instructions, data structures, program modules, or other data. Combinations of any of the above should also be included within the scope of readable media. In some embodiments, computer system 800 is part of a network that stores data in remote storage media for use by the computer system 800.

Reference has been made throughout this specification to "one embodiment" or "an embodiment," meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

We claim:

1. A method of managing updates to a recipient cache on a server, the method comprising:
sending from a mobile device to a server a request for a first recipient source, wherein the recipient source includes a priority value and identifies a plurality of recipients, wherein each of the plurality of recipients is associated with a weight, and wherein the first recipient source comprises a recipient cache that includes a list of previously contacted recipients by an email application on the server;
receiving, at the mobile device, the recipient cache from the server;
receiving a string of text; and
retrieving a second recipient source comprised of local contact recipients and a third recipient source comprised of local email recipients stored at the mobile device;
based on the string of text, resolving the recipient list stored at the mobile device based on a combination of the weight, the priority value, and a marking factor, wherein the marking factor corresponds to a user input at the mobile device indicating that a marked recipient is ranked higher than a non-marked recipient, and wherein resolving further comprises:
prioritizing the first recipient source, the second recipient source, and the third recipient source based on the priority value associated with each of the recipient sources;
ranking the plurality of recipients for each recipient source based on the weight associated with each recipient; and
ranking the marked recipient based on the marking factor.

2. The method of claim 1, wherein the recipient cache comprises an XML document listing the previously contacted recipients and information associated with the previously contacted recipients.

3. The method of claim 1, wherein the recipient list can be restricted to allow for a limited number of recipients.

4. The method of claim 1, wherein the recipients on the list are ranked based on weights assigned to each recipient in the list.

5. The method of claim 1, wherein the recipients on the recipient list are prioritized based on the following order of preference: from the recipient cache, recipients contacted by an email application on the mobile device, and contacts stored on the mobile device.

6. The method of claim 1, wherein the recipients on the recipient list are presented as aliases, formal names, or email addresses.

7. The method of claim 1, wherein the receiving the string of text comprises receiving the string of text from a user entering text into the mobile device.

8. A computer storage medium not consisting of a propagated data signal and encoding computer-executable instructions that, when executed, perform a method of managing updates to a recipient cache on a server, the method comprising:
sending from a mobile device to a server a request for a first recipient source, wherein the recipient source includes a priority value and identifies a plurality of recipients, wherein each of the plurality of recipients is associated with a weight, and wherein the first recipient source comprises a recipient cache that includes a list of previously contacted recipients by an email application on the server;
receiving, at the mobile device, the recipient cache from the server;
receiving a string of text; and
retrieving a second recipient source comprised of local contact recipients and a third recipient source comprised of local email recipients stored at the mobile device;
based on the string of text, resolving the recipient list stored at the mobile device based on a combination of the weight, the priority value, and a marking factor, wherein the marking factor corresponds to a user input at the mobile device indicating that a marked recipient is ranked higher than a non-marked recipient, and wherein resolving further comprises:
prioritizing the first recipient source, the second recipient source, and the third recipient source based on the priority value associated with each of the recipient sources;
ranking the plurality of recipients for each recipient source based on the weight associated with each recipient; and
ranking the marked recipient based on the marking factor.

9. The computer storage medium of claim 8, wherein the recipient cache comprises an XML document listing the previously contacted recipients and information associated with the previously contacted recipients.

10. The computer storage medium of claim 8, wherein the recipient list can be restricted to allow for a limited number of recipients.

11. The computer storage medium of claim 8, wherein the recipients on the list are ranked based on weights assigned to each recipient in the list.

12. The computer storage medium of claim 8, wherein the recipients on the recipient list are prioritized based on the following order of preference: from the recipient cache, recipients contacted by an email application on the mobile device, and contacts stored on the mobile device.

13. The computer storage medium of claim 8, wherein the recipients on the recipient list are presented as aliases, formal names, or email addresses.

14. The computer storage medium of claim 8, wherein the receiving the string of text comprises receiving the string of text from a user entering text into the mobile device.

15. A computer system comprising:
a processor; and
a memory communicatively coupled to the processor, the memory having computer-executable instructions that when executed by the processor, provide a method of managing updates to a recipient cache on a server, the method comprising:
sending from a mobile device to a server a request for a first recipient source, wherein the recipient source includes a priority value and identifies a plurality of recipients, wherein each of the plurality of recipients is associated with a weight, and wherein the first recipient source comprises a recipient cache that includes a list of previously contacted recipients by an email application on the server;
receiving, at the mobile device, the recipient cache from the server;
receiving a string of text; and
retrieving a second recipient source comprised of local contact recipients and a third recipient source comprised of local email recipients stored at the mobile device;

based on the string of text, resolving the recipient list stored at the mobile device based on a combination of the weight, the priority value, and a marking factor, wherein the marking factor corresponds to a user input at the mobile device indicating that a marked recipient is ranked higher than a non-marked recipient, and wherein resolving further comprises:

prioritizing the first recipient source, the second recipient source, and the third recipient source based on the priority value associated with each of the recipient sources;

ranking the plurality of recipients for each recipient source based on the weight associated with each recipient; and ranking the marked recipient based on the marking factor.

16. The computer system of claim 15, wherein the recipient cache comprises an XML document listing the previously contacted recipients and information associated with the previously contacted recipients.

17. The computer system of claim 15, wherein the recipient list can be restricted to allow for a limited number of recipients.

18. The computer system of claim 15, wherein the recipients on the list are ranked based on weights assigned to each recipient in the list.

19. The computer system of claim 15, wherein the recipients on the recipient list are prioritized based on the following order of preference: from the recipient cache, recipients contacted by an email application on the mobile device, and contacts stored on the mobile device.

* * * * *